United States Patent Office 3,225,104
Patented Dec. 21, 1965

3,225,104
HYDROXYBENZYLATED SULFONES AND COMPOSITIONS CONTAINING SAME
James Harding, Greenbrook Township, Somerset County, Ralph F. Sellers, Middlebush, and Cal Y. Meyers, Princeton, N.J., assignors to Union Carbide Corporation, a corporation of New York
No Drawing. Filed Sept. 1, 1961, Ser. No. 135,453
19 Claims. (Cl. 260—607)

This invention relates to hydroxybenzylated sulfones produced on reacting a phenol with a methylolated 4,4'-dihydroxydiphenyl sulfone. More particularly, this invention relates to hydroxybenzylated 4,4'-dihydroxydiphenyl sulfones which are especially useful as adhesives for binding abrasive particles in abrasive implements, and as additives to thermosetting phenolic resin compositions.

The reaction products of phenols and methylolated 4,4'-dihydroxydiphenyl sulfones of this invention are hydroxybenzylated 4,4'-dihydroxydiphenyl sulfones of the formula:

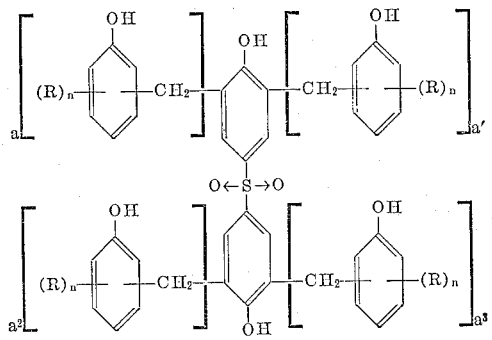

wherein: $a$, $a'$, $a^2$, and $a^3$, which can be the same or different, are intergers having values of 0 or 1 with the sum of $a$, $a'$, $a^2$, and $a^3$ being at least 1 and with the further limitation that the methylene group is bonded to the hydroxy phenyl group at a position other than meta to the hydroxy group. Each individual R, which can be the same or different, is an alkyl radical such as methyl, ethyl, n-propyl, n-hexyl and the like, preferably an alkyl radical having 1 to 4 carbon atoms inclusive; or a halogen atom, i.e., chlorine, bromine, iodine, or fluorine; or an alkoxy radical such as methoxy, ethoxy, n-propoxy, n-amyloxy and the like, preferably an alkoxy radical having from 1 to 4 carbon atoms inclusive; and each individual $n$, which can be the same or different, is an integer having a value of 0 or 1.

Illustrative of suitable phenols that can be reacted with the methylolated dihydroxydiphenyl sulfones to produce the reaction products of this invention can be noted phenols having the formula:

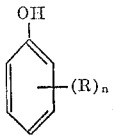

wherein R and $n$ are as previously defined. Illustrative of such phenols are phenol, substituted phenols, such as the alkylated phenols exemplary of which are m-cresol, o-cresol, m-ethylphenol, m,n-propylphenol, m-isopropylphenol, m,n-butylphenol, m-sec-butylphenol, p-tert-butylphenol, o-amylphenol and other like phenols, as well as the commercially available meta-cresol which contains small amounts of both the para and the ortho isomers; substituted alkoxy phenols such as o-methoxyphenol, m-ethoxyphenol, p,n-propoxyphenol, m-amyloxphenol and the like; and halogenated phenols such as m-chlorophenol, m-bromophenol, p-chlorophenol, o-bromophenol and the like.

The methylolated 4,4'-dihydroxydiphenyl sulfones that are reacted with the phenols noted above have the formula:

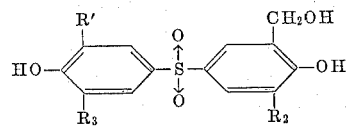

wherein R', $R^2$ and $R^3$, which can be the same or different, are hydrogen or methylol.

The mono, the 3,3'-di-, and the 3,3',5,5'-tetramethylol derivatives of 4,4'-dihydroxydiphenyl sulfones are prepared by heating, at temperatures of 50° C. to 80° C., a mixture of one mole of 4,4'-dihydroxydiphenyl sulfone, from one to two moles of sodium hydroxide, and 2 moles of formaldehyde per each methylol group desired to be substituted on each phenyl group.

3,3',5-trimethylol 4,4'-dihydroxydiphenyl sulfone can be prepared by heating, at a temperature of about 100° C., a mixture of one mole of 4,4'-dihydroxydiphenyl sulfone, 2 moles of sodium hydroxide and 6 moles of formaldehyde.

3,5-dimethylol 4,4'-dihydroxydiphenyl sulfone can be prepared by heating, at a temperature of about 60° C. 3,3',5-trimethylol 4,4'-dihydroxydiphenyl sulfone, 2 moles of sodium hydroxide and 2 moles of dimethyl sulfate.

Detailed description of preparing methylolated derivatives of 4,4'-dihydroxydiphenyl sulfone is to be found in application Serial No. 135,451, filed concurrently herewith, by C. Y. Meyers, which is incorporated herein by reference.

Various amounts of a phenol can be reacted with a methylolated sulfone, generally at least about one mole of phenol per mole of methylolated sulfone. The amount of phenol actually used in each instance will depend upon the number of methylol groups per molecule of sulfone through which hydroxyphenyl groups are connected to each sulfone molecule through methylene linkages. These methylene linkages are formed as a result of a reaction between the phenol and -(CH$_2$OH) equivalents of the sulfone. For purposes of these calculations one

group is deemed to react with one -(CH$_2$OH) equivalent.

The reaction between a phenol and a methylolated 4,4'-dihydroxydiphenyl sulfone is conducted, generally, at temperatures of from about 50° C. to about 160° C., and preferably from about 100° C. to about 120° C.

This reaction can be conducted under atmospheric, subatmospheric or superatmospheric pressure.

In conducting the reaction between a phenol and a methylolated 4,4'-dihydroxydiphenyl sulfone, it is customary to adjust the pH of the reaction mixture to a value of about 0.2 to about 2, and preferably about 0.8 to about 1.2, by the use of an acid. For this purpose, any suitable organic or inorganic acid can be used. Illustrative of suitable organic acids are the dibasic acids, such as those having the formula:

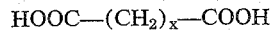

wherein: $x$ is an integer having a value of 0 to 20 inclusive, exemplary of which are oxalic acid, malonic acid, succinic acid, glutaric acid and the like; monocarboxylic acids, such as the fatty acids, having the formula:

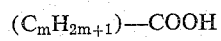

wherein: $m$ is an integer having a value of 0 to 20 inclusive, exemplary of which are formic acid, acetic acid, propionic acid, butyric acid, capric acid, caproic acid, lauric acid, palmitic acid, stearic acid and the like.

Illustrative of suitable inorganic acids are the strong mineral acids such as hydriodic acid, hydrobromic acid, hydrochloric acid, hydrofluoric acid, sulfuric acid, phosphoric acid, orthophophorous acid and the like.

As a rule the reaction mixture is heated at the desired temperature until condensation is complete, which generally takes about 1 hour at 100° C. when the pH is 1.0 or less. Recovery of the hydroxybenzylated 4,4'-dihydroxydiphenyl sulfone from the reacted mixture can be conveniently accomplished by subjecting the reacted mixture to a distillation operation and recovering the desired sulfone as the residue.

The hydroxybenzylated 4,4'-dihydroxydiphenyl sulfones of this invention, in addition to being excellent adhesive binders, can also be added to condensation products of a phenol and an aldehyde to provide thermosetting phenolic resin compositions which have excellent heat resistivity and therefore are particularly desirable for use in applications wherein resistivity to heat is essential. These compositions can be formed into shaped structures and successfully used as parts for missiles and high speed aircraft as they undergo none of the undesirable dimensional changes attributed to presently known thermosetting phenolic resin compositions. In addition, these compositions, by reason of their relatively light weight and by reason of their resistivity to heat, i.e., retention of physical strengths on high temperature aging, are preferred over ceramics and metals in applications wherein both relative lightness in weight and heat resistivity are desired.

On utilizing the reaction products of this invention as additives to thermosetting phenolic resin compositions, they are used in a heat stabilizing amount, that is in an amount sufficient to stabilize the phenolic compositions against the effect of heat. Generally, the compositions contain from about 3 percent by weight to about 250 percent by weight and preferably from about 25 percent by weight to about 100 percent by weight, based on the weight of the condensation product of a phenol and an aldehyde.

In those instances wherein the condensation product of a phenol and an aldehyde is liquid, the weight thereof is based upon its solids content. The solids content is determined according to the following procedure: a 1.5 gram sample of the condensate is heated in an oven, which is at 135° C., for 3 hours. The residue is then cooled to room temperature, about 23° C., and weighed. The numerical weight of the residue is divided by the numerical weight of the sample and the result multiplied by 100. The result obtained indicates the percent weight per 1.5 grams of liquid condensate.

Suitable condensation products of a phenol and an aldehyde, for purposes of this invention, are the condensates, generally acid catalyzed, referred to as "novolac resins" and condensates, generally alkaline catalyzed, referred to as "resole resins."

Condensates, referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixtures in less than stoichiometric amounts. Novolac resins are generally fusible, brittle, grindable resins which can be converted to the infusible state by the addition thereto of a methylene-generating agent such as hexamethylenetetramine.

Condensates, referred to as "resole resins" are usually prepared by condensing a phenol and an aldehyde in the presence of a base such as an alkali metal oxide or hydroxide or an alkaline earth metal oxide or hydroxide, as for example, sodium hydroxide, potassium hydroxide, calcium hydroxide, calcium oxide and the like, or an amine, or ammonia; wherein the aldehyde is present in the reaction mixture in greater than stoichiometric amounts. The resoles can be either liquid resins, soft resins having a low melting point or hard, brittle, grindable resins and are heat-hardenable per se to the infusible state, that is, they will thermoset to infusible products under the influence of heat.

Illustrative of suitable phenols which can be condensed with an aldehyde to produce condensation products of a phenol and an aldehyde whose heat-resistance can be significantly improved by the addition thereto of a hydroxybenzylated 4,4'-dihydroxydiphenyl sulfone can be noted: phenol; dihydric phenols such as resorcinol; meta-substituted phenols such as the meta-alkylated phenols exemplary of which are m-cresol, m-ethylphenol, m-n-propylphenol, m-isopropylphenol, m-n-butylphenol, m-sec-butylphenol, m-tert-butylphenol, m-amylphenol and other like phenols, particularly those wherein the alkyl substituent contains from 1 to 6 carbon atoms inclusive, as well as the commercially available meta-cresol which contains small amounts of both the para and the ortho isomers; meta-substituted alkoxy phenols such as m-methoxyphenol, m-ethoxyphenol, m-n-propoxyphenol, and the like particularly those wherein the alkoxy group contains from 1 to 6 carbon atoms inclusive; meta-halogenated phenols such as m-chlorophenol, m-bromophenol and the like.

Examples of aldehydes which can be condensed with the phenols listed above to produce the phenol-aldehyde condensates are: formaldehyde in any of its available forms, i.e., formalin, para-formaldehyde; furfural and the like.

For a detailed discussion of condensates produced from a phenol and an aldehyde and methods for the production thereof, reference is made to the books: "Phenoplasts" by T. S. Carswell, published in 1947 by Interscience Publishers and "Chemie de Phenolharze" by K. Hultzsch, Springer Verlag 1950, which are incorporated herein by reference.

The compositions can be formulated by a number of convenient methods. A particularly preferred method of preparation is one wherein a condensate of a phenol and an aldehyde is prepared in a resin still and the desired hydroxybenzylated 4,4'-dihydroxydiphenyl sulfone added directly thereto just prior to the dehydration of the condensate. As an illustration of this preferred method, a composition could be prepared as follows: Into a still there is charged 150 parts by weight of formalin (37%) and 100 parts by weight phenol. Three parts by weight barium hydroxide are then added and the contents in the still brought to 80° C. and maintained at this temperature for 2 hours while under a pressure of 330 mm. of Hg. At the end of the two hour period, the contents of the still are neutralized and then brought to a pH of 3.50 to 4.50 by the addition thereto of phosphoric acid (75%). Thereafter, 5.5 parts by weight of hexamethylenetetramine are added into the still, followed by the addition of 70 parts by weight of a hydroxybenzylated 4,4'-dihydroxydiphenyl sulfone. The contents of the still are vacuum dehydrated up to a temperature of about 90° C. to about 100° C. under a pressure of about 25–75 mm. of Hg. The composition so obtained upon being cooled to room temperature, about 23° C., is heat-hardenable, that is, capable of thermosetting to an infusible product, and is also grindable.

As another convenient method of formulating compositions of this invention, a condensate of a phenol and an aldehyde can be compounded with a suitable hydroxybenzylated 4,4'-dihydroxydiphenyl sulfone on a two-roll mill to form a homogeneously blended composition.

When the condensate of a phenol and an aldehyde which is to be admixed with a hydroxybenzylated 4,4'-dihydroxydiphenyl sulfone is a so-called novolac resin, it is customary to incorporate into the resultant composition a methylene-generating compound which will insure that the composition, when heated, will thermoset to an infusible product. Illustrative of such methylene-generating compounds are hexamethylenetetramine, anhydro-formaldehyde aniline, paraform and the like. In those instances wherein the composition contains a material which is thermosetting per se, that is, wherein the condensate of a phenol and an aldehyde is heat-hardenable, no such methylene-generating compounds are generally used. A discussion of suitable methylene-generating compounds is to be found in the book to T. S. Carswell, previously noted.

When used, the methylene-generating compounds are employed in amounts of from about 5 percent by weight to about 20 percent by weight, preferably about 10 percent by weight based on the weight of the condensate of a phenol and an aldehyde. More than 20 percent by weight can be used but this is economically undesirable.

Also, of so desired, any of the conventional catalysts used to promote the thermosetting of phenolic resins can be used, in all instances, as an aid in thermosetting the compositions of this invention. These catalysts, when employed are used in amounts of from about 1 percent by weight to about 20 percent by weight, preferably from about 2 percent by weight to about 6 percent by weight based on the combined weight of the hydroxybenzylated 4,4'-dihydroxydiphenyl sulfone and the condensate of a phenol and an aldehyde. Exemplary of such catalysts are the alkali metal hydroxides such as sodium hydroxide, potassium hydroxide and the like; the alkaline earth metal hydroxides such as calcium hydroxide and the like; alkaline earth metal oxides such as calcium oxide and the like.

Compositions of this invention can also contain various other additives, as are well-known in the art. Illustrative of such additives are the so-called fillers which are inert materials usually added to phenolic resin compositions in order to improve the physical characteristics thereof. Illustrative of such fillers are the following: the mineral fillers such as asbestos, wollastonite, mica, silica, graphite cloth, graphite fibers, and the like; and organic fillers such as woodflour, cotton flock, polyamide fibers, polyester fibers, and the like.

Fillers, when used, are generally employed in amounts of from about 15 percent by weight to about 300 percent by weight based on the combined weight of the hydroxybenzylated 4,4'-dihydroxydiphenyl sulfone and the condensate of a phenol and an aldehyde.

Other materials, commonly added to phenolic resin compositions, are lubricants such as carnauba wax, candelilla wax, zinc stearate and the like; and colorants such as titanium dioxide and the like.

As previously pointed out, the compositions of this invention have particular utility as compositions which can be molded into articles of desired shape and the articles so produced used in applications wherein excellent resistivity to heat is required. The exact conditions under which compositions of this invention can be molded will, of course, vary depending in part upon the particular composition being molded and the configuration and size of the article being formed. As a general rule, suitable molding temperatures range from about 150° C. to about 200° C.

In formulating molding compostions of this invention, various compounding techniques can be used. Among such techniques can be noted the following:

(1) Dry blending a condensate of a phenol and an aldehyde, a hydroxybenzylated 4,4'-dihydroxydiphenyl sulfone and any desired additive in a ball mill, drum tumbler, or in a ribbon blender.

(2) Fluxing a condensate of a phenol and an aldehyde, a hydroxybenzylated 4,4'-dihydroxydiphenyl sulfone and any desired additive in a differential speed mill, a Banbury mixer or in an extruder, cooling the fluxed composition to room temperature, about 23° C. and grinding the fluxed composition to the desired particle size.

(3) Forming an organic solution or an aqueous solution of a mixture of a condensate of a phenol and an aldehyde and a hydroxybenzylated 4,4'-dihydroxydiphenyl sulfone, impregnating a filler such as asbestos with the solution, drying the impregnated filler and dicing the impregnated filler to the desired size.

(4) Forming a water slurry of a condensate of a phenol and an aldehyde, a hydroxybenzylated 4,4'-dihydroxydiphenyl sulfone and any desired additive, dropping the slurry onto a screen of a Fourdrinier paper making machine, drying the slurry to form a mat and then chopping the mat into small pieces of desired size.

The examples which follow illustrate the present invention and are not intended to limit the scope thereof in any manner.

*Example 1*

(a) Preparation of 3,3',5-trimethylol 4,4'-dihydroxydiphenyl sulfone having the formula:

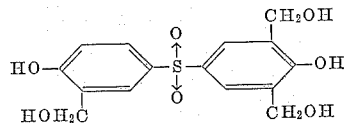

Twenty-six hundred grams (10.4 moles) of 4,4'-dihydroxydiphenyl sulfone and 3269 grams (20.8 moles) of sodium hydroxide (25.45%) were admixed in a 3 gallon laboratory reactor equipped with an agitator, a recording thermocouple and an exterior jacket. The mixture was then heated to 65° C. When all of the 4,4'-dihydroxydiphenyl sulfone had dissolved, 5059.6 grams (62.4 moles) of formaldehyde (37%) were added. The mixture was brought to 60° C. and held at that temperature for 25 hours. Analysis for free formaldehyde at this point and again after the solution stood for 17 hours at room temperature, about 23° C., showed that consumption of formaldehyde had essentially ceased. One thousand two hundred and forty-eight grams (15.6 moles) of sodium hydroxide (50%) were added to the mixture, the resultant solution heated to 70° C. and held at that temperature for 2.5 hours. The solution was then cooled to below about 25° C. and its pH adjusted to 3.4 by adding thereto 2587 grams of hydrochloric acid (37.5%) diluted with an equal volume of water. The 3,3',5-trimethylol-4,4'-dihydroxydiphenyl sulfone, which precipitated, was allowed to settle to the bottom of the reactor and the upper aqueous layer was siphoned off. The 3,3',5-trimethylol-4,4'-dihydroxyphenyl sulfone was washed with 12,225 grams of water and the aqueous layer removed from the sulfone by decantation.

(b) Preparation of the reaction product of phenol and the sulfone of (a), this reaction product being a mixture of compounds having the formula:

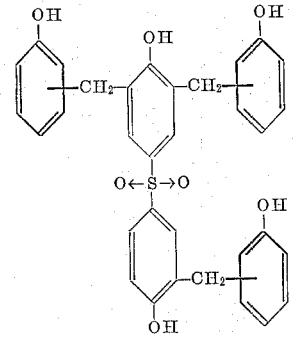

with the —CH$_2$— group bonded to the hydroxyphenyl group in a position other than meta to the hydroxy group:

Five thousand eight hundred and seventy-six grams (62.4 moles) of phenol were then added into the reactor which contained the 3,3′,5-trimethylol-4,4′-dihydroxydiphenyl sulfone and the mixture heated to a temperature of 60° C. The pH of the mixture was then adjusted to 0.5 by the addition thereto of hydrochloric acid (37.5%). The resultant solution was heated to atmospheric reflux, held at reflux for one hour and then vacuum distilled at a pressure of 25–75 mm. of mercury to a solid residue. The hydroxybenzylated sulfone, recovered in an amount of 3850 grams, was dark colored, brittle and had the following properties:

Viscosity _____ centistokes__ 9.8
Hot plate gel _____ seconds__ 63
Ring and ball melting point _____ ° C__ 107

Viscosity, hot plate gel, ring and ball melting point, and "formaldehyde" determinations noted in this application were made according to procedures described in the following publications published by Union Carbide Plastics Co., Division of Union Carbide Corporation.

Viscosity—Standard Testing Method, WC–31–I, Issue 4, pages 1–8, published March 30, 1961.
Hot plate gel—Standard Testing Method, WC–615–A–3/1, pages 1–2.
Ring and ball melting point—Standard Testing Method, WC–71–B, pages 1–8.
Formaldehyde—Standard Testing Method, WC–110–D–2/2, pages 1–4, published April 19, 1954.

Example 2

(a) Preparation of 3,3′,5-trimethylol-4,4′-dihydroxydiphenyl sulfone:

Eight hundred grams (3.2 moles) of 4,4′-dihydroxydiphenyl sulfone and 1024 grams (6.4 moles) of sodium hydroxide (25%) were admixed in a five liter glass flask equipped with a stainless steel agitator, a thermometer, and a condenser. The mixture was heated to 65° C. and when all of the 4,4′-dihydroxydiphenyl sulfone had dissolved, 1556.8 grams (19.2 moles) of 37% formaldehyde were added. The solution which formed was heated to 60° C. and held at this temperature for 25 hours. Analysis for formaldehyde at this time and again after the solution had stood for 17 hours at room temperature, about 23° C., showed that consumption of formaldehyde had essentially ceased. Three hundred and eighty-four grams (4.8 moles) of sodium hydroxide (50%) were added to the solution and the resultant solution heated to 70° C. and held at 70° C. for 2.5 hours. The solution was then cooled below about 25° C. and neutralized by the addition thereto of 784 grams of hydrochloric acid (37%) the upper aqueous layer was siphoned off. The 3,3′,5-trimethylol-4,4′-dihydroxydiphenyl sulfone, which precipitated, was allowed to settle to the bottom of the flask and upper aqueous layer was siphoned off. The 3,3′,5-trimethylol-4,4′-dihydroxydiphenyl sulfone was washed with 4000 grams of water and the aqueous layer removed from the sulfone by decantation.

(b) Preparation of the reaction product of phenol and the methylolated sulfone of (a), this reaction product having the same formula as (b) of Example 1:

One thousand eight hundred and eight grams (19.2 moles) of phenol were then added into the flask which contained the 3,3′,5-trimethylol-4,4′-dihydroxydiphenyl sulfone and the mixture heated to 60° C. The pH of the mixture was then adjusted to 0.95 by the addition thereto of oxalic acid. The resultant solution was heated to reflux, held at reflux for one hour and then vacuum distilled at a pressure of 25 to 75 mm. of mercury to a solid residue. The hydroxybenzylated sulfone, recovered in an amount of 1400 grams, was dark colored, brittle and had the following properties:

Viscosity _____ centistokes__ 7.8
Hot plate _____ seconds 39
Ring and ball melting point _____ ° C__ 113

Example 3

(a) Preparation of 3,3′-dimethylol 4,4′-dihydroxydiphenyl sulfone having the formula:

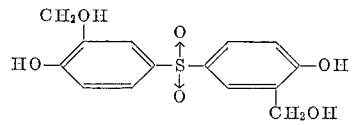

Four thousand grams (16 moles) of 4,4′-dihydroxydiphenyl sulfone and 5000 grams (32 moles) of sodium hydroxide (25.6%) were admixed in a 3 gallon laboratory still equipped with an agitator, a thermocouple, and an exterior jacket. The mixture was heated to 65° C. and when all of the 4,4′-dihydroxydiphenyl sulfone had dissolved, 5186 grams (64 moles) of formaldehyde (37.1%) were added. The temperature of the resultant solution was brought to 60° C. and held at that level for 25 hours. Analysis for free formaldehyde at this point and again after the solution had stood for 17 hours at room temperature, about 23° C., showed that consumption of formaldehyde had essentially ceased. Twenty-five hundred grams (16 moles) of sodium hydroxide (25.6%) were added to the solution, the solution heated to 70° C. and held at that temperature for 2.5 hours. The solution was then cooled to below about 25° C. and neutralized by adding thereto 3800 grams of hydrochloric acid (37.0%) diluted with an equal weight of water. The 3,3′-dimethylol-4,4′-dihydroxydiphenyl sulfone, which precipitated, was allowed to settle to the bottom of the still and the upper aqueous layer was siphoned off. The 3,3′-dimethylol-4,4′-dihydroxydiphenyl sulfone was washed with 10,000 grams of water and the aqueous layer decanted off.

(b) Preparation of a reaction product of phenol and the methylolated sulfone of (a), this reaction product being a mixture of compounds having the formula:

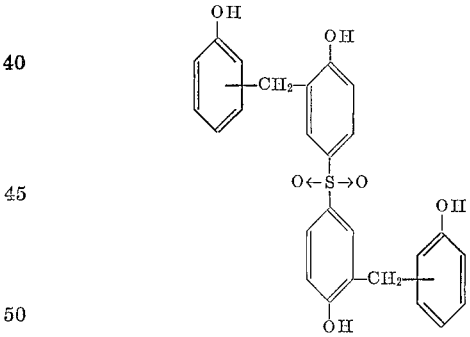

with the —CH₂— group bonded to the hydroxyphenyl group in a position other than meta to the hydroxy group:

Forty-four hundred grams (46.8 moles) of phenol were then added into the still which contained the 3,3′-dimethylol-4,4′-dihydroxydiphenyl sulfone and the mixture heated to 60° C. The pH of the mixture was then adjusted to 0.9 by the addition thereto of 24 grams oxalic acid. The resultant solution was heated to reflux, held at reflux for one hour and then vacuum distilled at a pressure of 25–75 mm. of mercury to a solid residue. The hydroxybenzylated sulfone, recovered in an amount of 4362 grams, was dark colored, brittle and had the following properties:

Viscosity _____ centistokes__ 7.1
Hot plate gel _____ seconds__ 61
Ring and ball melting point _____ ° C__ 113

Example 4

This example illustrates the use of reaction products of a phenol and methylolated sulfones as adhesive binders.

The reaction product of a phenol and a methylolated sulfone noted in Composition I was prepared as described in Example 1.

The reaction products of a phenol and a methylolated sulfone noted in Compositions II and III were prepared using the materials and procedures which are described below:

|  | Composition II | | Composition III | |
|---|---|---|---|---|
|  | Grams | Moles | Grams | Moles |
| 4,4'-dihydroxydiphenyl sulfone | 4,000 | 16 | 4,000 | 16 |
| 37% formalin | 5,200 | 64 | 5,200 | 64 |
| 25.45% NaOH | 2,515 | 16 | 5,030 | 32 |
| 37% HCl | 1,595 | 16 | 2,575 | 26 |
| Water | 3,190 |  | 5,150 |  |
| Phenol | 6,000 | 64 | 6,000 | 64 |

The following procedure was used in preparing the hydroxybenzylated sulfones of Compositions II and III.

The 4,4'-dihydroxydiphenyl sulfone and the formalin were admixed in a 3 gallon laboratory still which was equipped with an agitator, a thermocouple, and an exterior jacket. Sodium hydroxide was then added into the still and the mixture heated to reflux (about 80° C.) under a pressure of about 380 mm. of mercury for 3.5 hours. The reaction mixture was cooled to 60° C. and then neutralized by the addition thereto of hydrochloric acid which was diluted with water. The 3,3'-dimethylol-4,4'-dihydroxydiphenyl sulfone, which precipitated, was allowed to settle to the bottom of the still and the upper aqueous layer was siphoned off.

Phenol was then added into the still which contained the 3,3'-dimethylol-4,4'-dihydroxydiphenyl sulfone and the pH of the mixture was adjusted to between 0.5 to 1.2 with hydrochloric acid. The reaction mixture was heated to reflux (about 105° C.) under atmospheric pressure for 1 hour and then distilled to a pot temperature of 160° C. The contents of the flask were then vacuum distilled at 160° C. under a pressure of 25–75 mm. of mercury to a solid residue. The hydroxybenzylated sulfone recovered in each case had the properties noted below:

|  | Hydroxybenzylated sulfones of— | |
|---|---|---|
|  | Composition II | Composition III |
| Yield in grams | 6,121 | 7,390 |
| Viscosity (centistokes) | 9.3 | 8.8 |
| Hot plate gel (in seconds) | 45 | 36 |

One hundred parts by weight of the hydroxybenzylated sulfones of Compositions I–III were coarse-crushed and blended with various amounts of hexamethylenetetramine. The blend was finally ground in a micropulverizer, which was equipped with a 0.020 inch screen, and then tumbled for 0.5 hour in a glass tumbler. Each pulverized blend was combined with 1000 parts by weight of an abrasive grain, made up of 780 parts by weight aluminum oxide (a mixture of equal parts by weight of Nos. 12, 14 and 16 grit), 100 parts by weight of cryolite and 120 parts by weight of a liquid phenolic resin, according to the following procedure.

The liquid resin, identified hereinafter as Resin A, was admixed in a metal dish with the aluminum oxide until the aluminum oxide grains were coated by the resin. The cryolite and the pulverized blend of hydroxybenzylated sulfone and hexamethylenetetramine were then added, as a blend to the coated grit and the mixture thoroughly blended. A portion of each of the mixtures was cold pressed into bars of 1 inch by 6 inches by 0.5 inch having a density of about 2.9. Each bar was then placed in an oven for 48 hours. During this period the temperature of the oven was slowly increased from 80° C. to 185° C.

Flexural strengths of these bars are noted in the table which follows. Also noted in the table which follows are flexural strengths of bars formed in the same manner and using the same materials as described above with the exception that Phenolic Resin B was used in lieu of the reaction products of a phenol and a methylolated sulfone.

|  | Parts by weight hexamethylenetetramine | Flexural Strength (p.s.i.) at 23° C. | Flexural strength (p.s.i.) at 260° C. |
|---|---|---|---|
| Composition I | 16 | 5,272 | 2,397 |
| Composition II | 10 | 4,277 | 2,038 |
| Composition III | 10 | 4,417 | 3,098 |
| Composition III | 13 | 3,570 | 3,039 |
| Composition III | 16 | 3,402 | 2,265 |
| Resin B | 10 | 3,893 | 1,284 |

Flexural strength determinations, noted in this and subsequent examples, were made according to ASTM D–790–49T.

Phenolic Resin A, noted in this example, was prepared by reacting 1.06 moles of phenol with 1 mole of paraformaldehyde in the presence of 0.015 mole of sodium hydroxide at a temperature of about 80° C. The resin had a viscosity of 315 centipoises at 25° C. and contained 70 percent by weight solids.

Phenolic Resin B, noted in this example, was prepared by heating a mixture of 1.06 moles of phenol with 0.86 mole of 37% formaldehyde in the presence of about 0.006 mole of oxalic acid at atmospheric reflux for about 5 hours and dehydrating the resulting product to 160° C. at atmospheric pressure. The resin had a viscosity of 20 centipoises at 25° C.

*Example 5*

Molding compositions were formulated by admixing the materials noted below to a homogeneous blend and then molding the blend into bars.

|  | Parts by weight | |
|---|---|---|
|  | Control I | Composition IV |
| Phenolic Resin C | 27.0 |  |
| Reaction product of phenol and methylol-4,4'-dihydroxydiphenyl sulfone |  | 26.7 |
| Hexamethylenetetramine | 3.0 | 3.3 |
| Hydrated lime | 2.5 | 2.5 |
| Calcium stearate | 1.0 | 1.0 |
| Nigrosine | 1.5 | 1.5 |
| Limestone | 12.5 | 12.5 |
| Asbestos | 52.5 | 52.5 |
| Physical properties: |  |  |
| Flexural strength (p.s.i.) as formed, tested at 23° C | 6,570 | 5,820 |
| Heat aged for 7 days at 260° C., tested at 23° C | 958 | 1,698 |
| Percent weight loss after being aged at 260° C. for 7 days | 17.2 | 14.1 |

Control I and Composition IV were each prepared by placing the materials noted in the foregoing table into a small drum and dry tumbling the mixture for 15 minutes. The dry mix was then compounded on a two-roll differential speed mill wherein the temperature of the front roll was 95° C. and the temperature of the back roll was at 140° C. Rolling time for Control I and Composition IV was 60 seconds and 40 seconds respectively. Each composition was taken off the mill in the form of a sheet, cooled to room temperature, about 23° C., ground to an average particle size of 12 mesh in an Abbe' mill. Control I and Composition IV were then molded into bars having the following dimensions: ¼ of an inch by ½ of an inch by 5 inches. The molding cycle took 5 minutes and was conducted at a temperature of 180° C. and under a pressure of 2,600 p.s.i. Each bar was then baked for 16 hours at 130° C.

Phenolic Resin C noted in this example was prepared in a manner described for Resin B with the exception that 0.850 mole formaldehyde (37%) was used.

The reaction product of phenol and mono-methylol 4,4'-dihydroxydiphenyl sulfone was prepared in the following manner:

(a) Preparation of monomethylol - 4,4' - dihydroxydiphenyl sulfone having the formula:

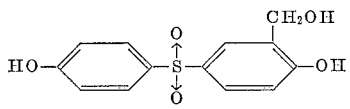

Eight hundred and nine grams of sodium hydroxide (99%) dissolved in 500 grams of water were added to a mixture of 2500 grams (10 moles) of 4,4'-dihydroxydiphenyl sulfone and 1621 grams (20 moles) of formaldehyde (37%). The mixture was heated at 57° C. for 16 hours and then sufficient hydrochloric acid (16%) added thereto to bring the mixture to a pH of 3. With the addition of the hydrochloric acid, the mixture separated into an organic layer and an aqueous layer. The upper aqueous layer was decanted off and the organic layer then washed with water until the water washings contained no measurable amount of chloride ion. The organic layer was vacuum distilled to a temperature of 150° C. and under a pressure of 2 inches of mercury to a solid residue. The methylol-4,4'-dihydroxydiphenyl sulfone recovered as the residue was dark colored, brittle solid.

(b) Preparation of the reaction product of phenol and the sulfone of (a), this reaction product being made up of compounds having the formula:

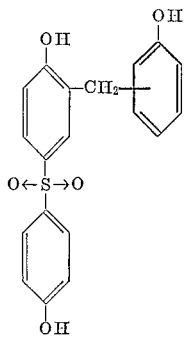

with the —$CH_2$— group bonded to the hydroxyphenyl group in a position other than meta to the hydroxy group:

To 4461 grams of the sulfone product of (a), there was added 6800 grams of phenol, and 10 grams of sulfuric acid. The mixture was heated to 120° C. and maintained at this temperature for 3 hours. The resultant solution was heated to 165° C. under a pressure of 25–75 mm. of mercury to a solid residue.

What is claimed is:

1. A hydroxybenzylated 4,4'-dihydroxydiphenyl sulfone of the formula:

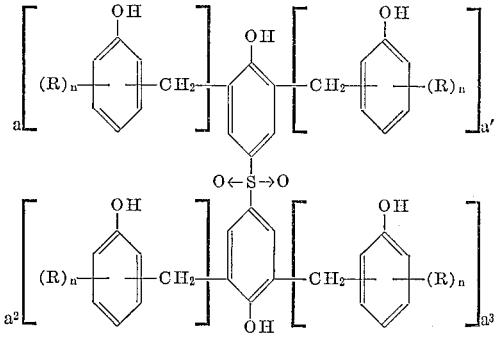

where $a$, $a'$, $a^2$, $a^3$ are integers having values of 0 to 1 inclusive with the sum of said integers being at least one and with the further limitation that each methylene group is bonded to the hydroxyphenyl group in a position other than meta to the hydroxy group; each individual R is a member selected from the group consisting of alkyl radicals containing a maximum of 6 carbon atoms, alkoxy radicals containing a maximum of 5 carbon atoms and halogen atoms; and each $n$ is an integer having a value of 0 to 1 inclusive.

2. A hydroxybenzylated 4,4'-dihydroxydiphenyl sulfone of the formula:

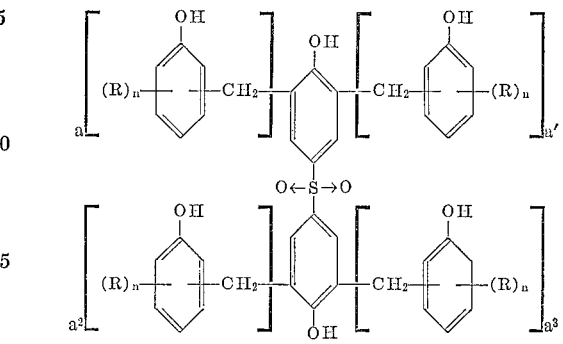

wherein $a$, $a'$, $a^2$, $a^3$ are integers having values of 0 to 1 inclusive with the sum of said integers being at least one and with the further limitation that each methylene group is bonded to the hydroxyphenyl group in a position other than meta to the hydroxy group; each individual R is a member selected from the group consisting of alkyl radicals containing a maximum of 6 carbon atoms, alkoxy radicals containing a maximum of 5 carbon atoms and halogen atoms; and each $n$ has a value of 0.

3. A hydroxybenzylated 4,4'-dihydroxydiphenyl sulfone of the formula:

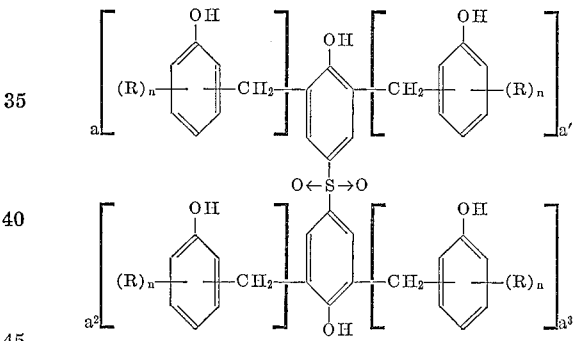

wherein $a$, $a'$, $a^2$, and $a^3$ are integers having values of 0 to 1 inclusive with the sum of said integers being at least one and with the further limitation that each methylene group is bonded to the hydroxyphenyl group in a position other than meta to the hydroxy group; each individual R is a member selected from the group consisting of alkyl radicals having from 1 to 4 carbon atoms inclusive, alkoxy radicals having from 1 to 4 carbon atoms inclusive, and, halogen atoms, and each $n$ is an integer having a value of 0 to 1 inclusive.

4. A hydroxybenzylated 4,4'-dihydroxydiphenyl sulfone as defined in claim 1 wherein each individual R is an alkyl radical containing a maximum of 6 carbon atoms and $a$, $a'$ $a^2$, $a^3$ and $n$ are as defined in claim 1.

5. A hydroxybenzylated 4,4'-dihydroxydiphenyl sulfone of the formula:

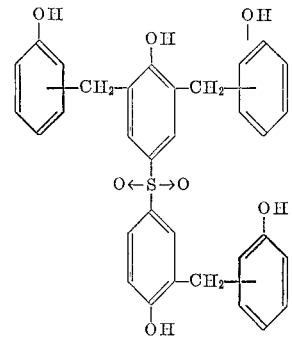

wherein the methylene group is bonded to the hydroxyphenyl group in a position other than meta to the hydroxy group.

6. A hydroxybenzylated 4,4'-dihydroxydiphenyl sulfone of the formula:

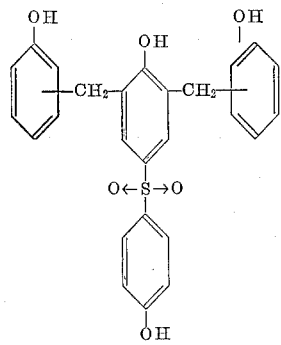

wherein the methylene group is bonded to the hydroxyphenyl group in a position other than meta to the hydroxy group.

7. A hydroxybenzylated 4,4'-dihydroxydiphenyl sulfone of the formula:

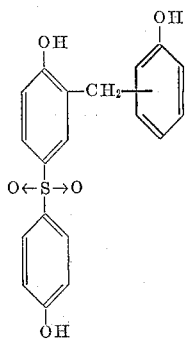

wherein the methylene group is bonded to the hydroxyphenyl group in a position other than meta to the hydroxy group.

8. A method of producing a hydroxybenzylated 4,4'-dihydroxydiphenyl sulfone which comprises reacting a phenol of the formula:

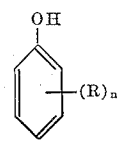

wherein R is a member selected from the group consisting of alkyl radicals containing a maximum of 6 carbon atoms, alkoxy radicals containing a maximum of 5 carbon atoms and halogen atoms and $n$ is an integer having a value of 0 to 1 inclusive with a methylolated 4,4'-dihydroxydiphenyl sulfone of the formula:

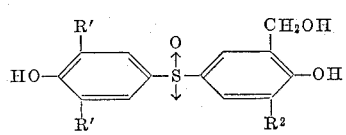

wherein R', R² and R³ are members selected from the group consisting of hydrogen and methylol, said phenol used in an amount of at least about one mole per-$CH_2OH$ equivalent.

9. A method of producing a hydroxybenzylated 4,4'-dihydroxydiphenyl sulfone which comprises reacting at a temperature of about 50° C. to about 160° C., a phenol of the formula:

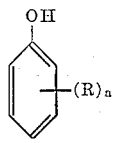

wherein R is a member selected from the group consisting of alkyl radicals containing a maximum of 6 carbon atoms, alkoxy radicals containing a maximum of 5 carbon atoms and halogen atoms and $n$ is an integer having a value of 0 to 1 inclusive with a methylolated 4,4'-dihydroxydiphenyl sulfone of the formula:

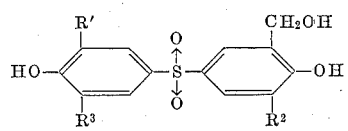

wherein R', R² and R³ are members selected from the group consisting of hydrogen and methylol, said phenol used in an amount of at least about one mole per-$CH_2OH$ equivalent.

10. A hydroxybenzylated 4,4'-dihydroxydiphenyl sulfone of the formula:

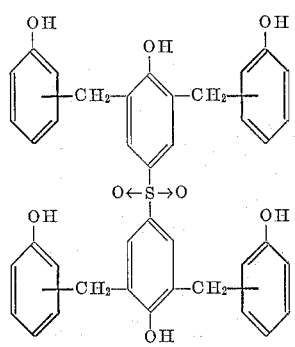

wherein the methylene group is bonded to the hydroxyphenyl group in a position other than meta to the hydroxy group.

11. A method of producing a hydroxybenzylated 4,4'-dihydroxydiphenyl sulfone which comprises reacting at a temperature of about 100° C. to about 120° C., a phenol of the formula:

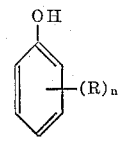

wherein R is a member selected from the group consisting of alkyl radicals containing a maximum of 6 carbon atoms, alkoxy radicals containing a maximum of 5 carbon atoms and halogen atoms and $n$ is an integer having a value of 0 to 1 inclusive with a methylolated 4,4'-dihydroxydiphenyl sulfone of the formula:

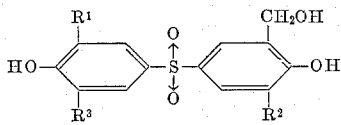

wherein R', R² and R³ are members selected from the group consisting of hydrogen and methylol, said phenol used in an amount of at least about one mole per-$CH_2OH$ equivalent.

12. A method of producing a hydroxybenzylated 4,4'-dihydroxydiphenyl sulfone which comprises admixing in a reaction medium having a pH of about 0.2 to about 2, a phenol of the formula:

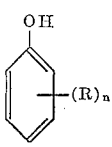

wherein R is a member selected from the group consisting of alkyl radicals containing a maximum of 6 carbon atoms, alkoxy radicals containing a maximum of 5 carbon atoms and halogen atoms and $n$ is an integer having a value of 0 to 1 inclusive with a methylolated 4,4'-dihydroxydiphenyl sulfone of the formula:

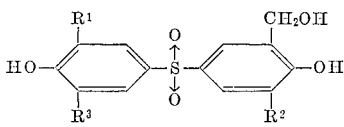

wherein R', $R^2$ and $R^3$ are members selected from the group consisting of hydrogen and methylol, said phenol used in an amount of at least about one mole per $CH_2OH$ equivalent.

13. A method of producing a hydroxybenzylated 4,4'-dihydroxydiphenyl sulfone which comprises admixing in a reaction medium having a pH of about 0.8 to about 1.2, a phenol of the formula:

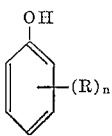

wherein R is a member selected from the group consisting of alkyl radicals containing a maximum of 6 carbon atoms, alkoxy radicals containing a maximum of 5 carbon atoms and halogen atoms and $n$ is an integer having a value of 0 to 1 inclusive with a methylolated 4,4'-dihydroxydiphenyl sulfone of the formula:

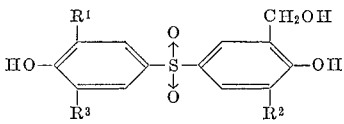

wherein R', $R^2$ and $R^3$ are members selected from the group consisting of hydrogen and methylol, said phenol used in an amount of at least about one mole per $CH_2OH$ equivalent.

14. A method of producing a hydroxybenzylated 4,4'-dihydroxydiphenyl sulfone which comprises admixing at a temperature of about 50° C. to about 160° C. in a reaction medium having a pH of about 0.2 to about 2, a phenol of the formula:

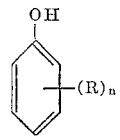

wherein R is a member selected from the group consisting of alkyl radicals containing a maximum of 6 carbon atoms, alkoxy radicals containing a maximum of 5 carbon atoms and halogen atoms and $n$ is an integer having a value of 0 to 1 inclusive with a methylolated 4,4'-dihydroxydiphenyl sulfone of the formula:

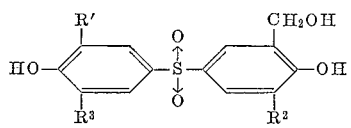

wherein R', $R^2$ and $R^3$ are members selected from the group consisting of hydrogen and methylol, said phenol used in an amount of at least abou tone mole per-$CH_2OH$ equivalent.

15. A method of producing a hydroxybenzylated 4,4'-dihydroxydiphenyl sulfone which comprises admixing at a temperature of about 100° C. to about 120° C. in a reaction medium having a pH of about 0.8 to about 1.2, a phenol of the formula:

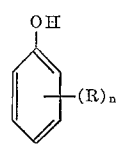

wherein R is a member selected from the group consisting of alkyl radicals containing a maximum of 6 carbon atoms, alkoxy radicals containing a maximum of 5 carbon atoms and halogen atoms and $n$ is an integer having a value of 0 to 1 inclusive with a methylolated 4,4'-dihydroxydiphenyl sulfone of the formula:

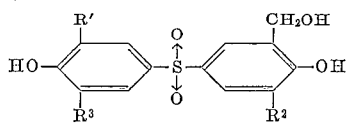

wherein R', $R^2$ and $R^3$ are members selected from the group consisting of hydrogen and methylol, said phenol used in an amount of at least about one mole per-$CH_2OH$ equivalent.

16. A method as defined in claim 9 wherein the said sulfone is 3,3',5-trimethylol 4,4'-dihydroxydiphenyl sulfone.

17. A method as defined in claim 9 wherein the said sulfone is 3,3,5-trimethylol 4,4'-dihydroxydiphenyl sulfone.

18. A method as defined in claim 9 wherein the said sulfone is 3,5-dimethylol 4,4'-dihydroxydiphenyl sulfone.

19. A method as defined in claim 9 wherein the said sulfone is mono-methylol 4,4'-dihydroxydiphenyl sulfone.

References Cited by the Examiner

UNITED STATES PATENTS

| | | | |
|---|---|---|---|
| 2,332,235 | 10/1943 | Kistler | 51—298 |
| 2,470,077 | 5/1949 | Fincke | 260—607 |
| 2,484,489 | 10/1949 | Craig et al. | 260—607 |
| 2,531,863 | 11/1950 | Scott et al. | 260—43 |
| 2,538,753 | 1/1951 | Barkhuff et al. | 260—43 |
| 2,552,485 | 5/1951 | Howard et al. | 51—298 |
| 2,552,500 | 5/1951 | Von Doenhoff | 51—298 |
| 2,628,982 | 2/1953 | James | 260—607 |
| 2,849,416 | 8/1958 | Bender eta al. | 260—43 |

CHARLES B. PARKER, *Primary Examiner.*

D. D. HORWITZ, *Examiner.*